Aug. 6, 1940. C. FIELD 2,210,070
METHOD OF MAKING A FLEXIBLE CYLINDER
Original Filed Aug. 14, 1931 3 Sheets-Sheet 1
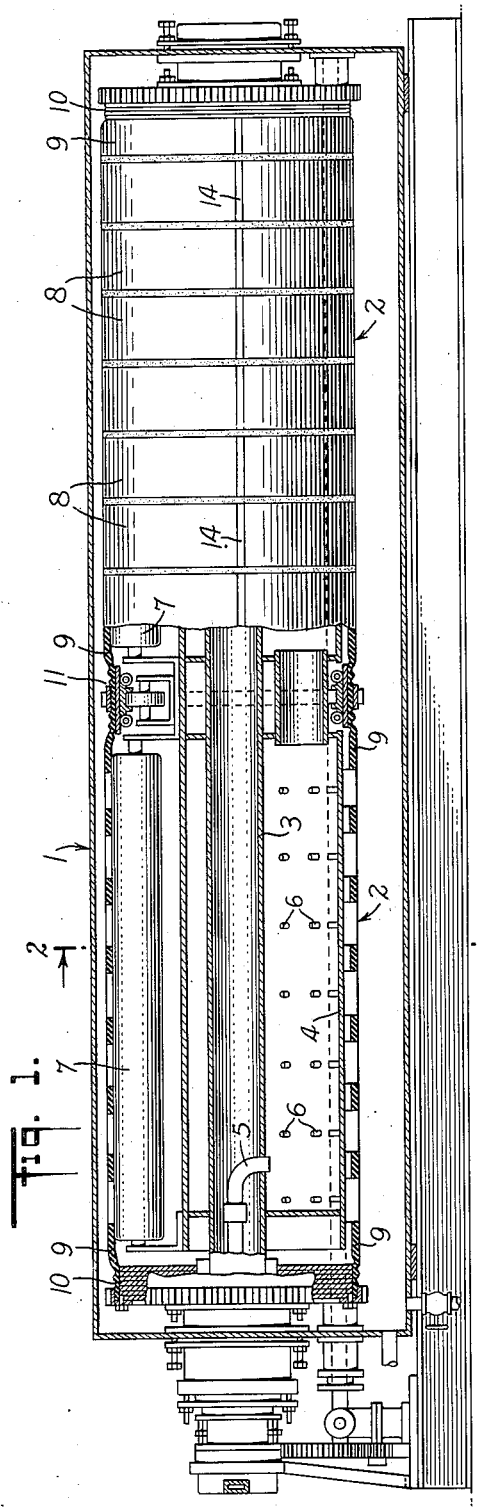
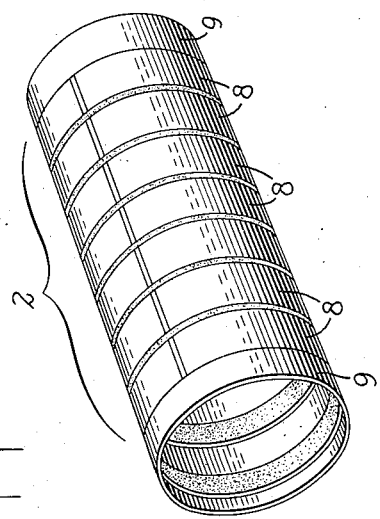
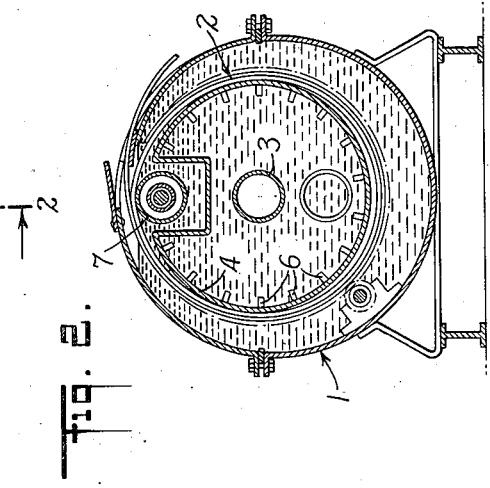
INVENTOR
Crosby Field
BY
Blair, Curtis, Dunne + Hayward
ATTORNEYS Aug. 6, 1940.   C. FIELD   2,210,070
METHOD OF MAKING A FLEXIBLE CYLINDER
Original Filed Aug. 14, 1931   3 Sheets-Sheet 2
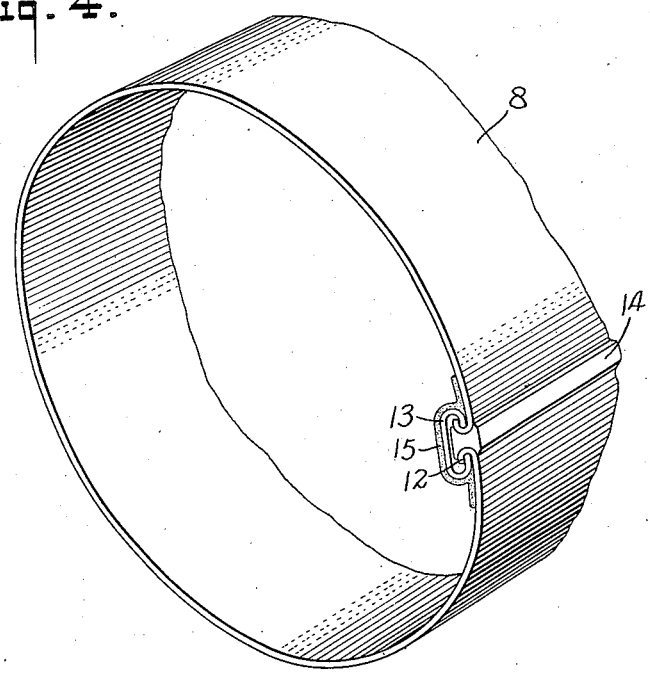
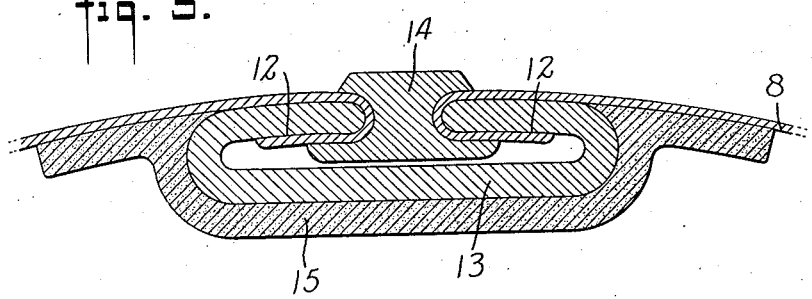
INVENTOR
Crosby Field
BY
Blair, Curtis, Dunne & Hayward
ATTORNEYS

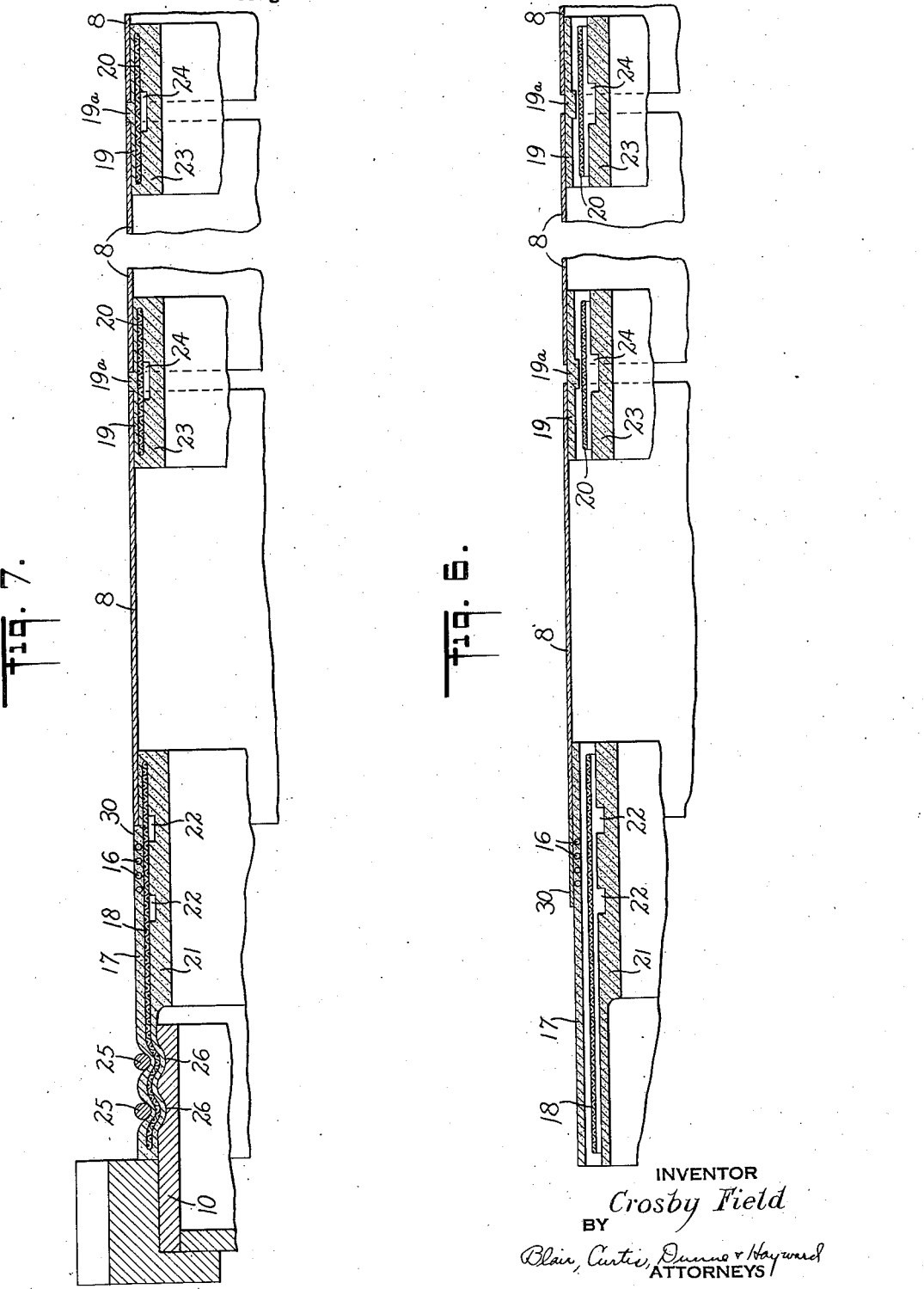
Aug. 6, 1940.   C. FIELD   2,210,070
METHOD OF MAKING A FLEXIBLE CYLINDER
Original Filed Aug. 14, 1931   3 Sheets-Sheet 3
INVENTOR
Crosby Field
BY
Blair, Curtis, Dunne & Hayward
ATTORNEYS Patented Aug. 6, 1940

2,210,070

UNITED STATES PATENT OFFICE 2,210,070

METHOD OF MAKING A FLEXIBLE CYLINDER

Crosby Field, Brooklyn, N. Y., assignor to Flakice Corporation, Wilmington, Del., a corporation of Delaware Original application August 14, 1931, Serial No. 557,107. Divided and this application January 22, 1937, Serial No. 121,769

6 Claims. (Cl. 154—42)

This invention relates to the fabrication of readily flexible bodies such as cylinders. Such cylinders have particular use in ice-making apparatus such as described in Patent No. 2,005,734, issued June 25, 1934, although such cylinders may have other uses.

It is an object of the present invention to provide an improved method of fabricating such cylinders by joining together individual panels.

This application is a division of my copending application Serial No. 557,107, filed August 14, 1931.

The nature and further objects of the invention will be apparent to those skilled in the art from the following description and the accompanying drawings.

In the drawings:—

Figure 1 is a side elevation partly in section of an assembled machine in which a cylinder made in accordance with one embodiment of the invention is used.

Figure 2 is a vertical sectional view taken on the line 2—2 of Figure 1.

Figure 3 is an isometric projection of the flexible cylinder.

Figure 4 is an enlarged isometric view of one of the panels of the cylinder and showing the manner in which the ends of the metal sheets are united.

Figure 5 is an enlarged cross-sectional view of the panel showing the manner of uniting the ends of the metal sheets.

Figure 6 is an enlarged longitudinal sectional view of a portion of the flexible cylinder at one stage in its manufacture and showing the manner in which the several metal sheets are united at their edges; and showing also the end aprons of the cylinder for attaching the cylinder to suitable cylinder ends or heads.

Figure 7 is a similar view of the completed cylinder and showing its manner of attachment to the cylinder end or head.

It is though that a brief description of a machine in which such a cylinder is used will be helpful in understanding the invention. The term cylinder is herein used in its broader connotation and is intended to describe any hollow body in the shape of a surface of revolution generated by a straight line.

Referring to Figures 1 and 2, the machine consists generally of a tank 1 in which rotates a freezing cylinder 2. Water is maintained in the tank 1 at a level slightly below the top of the cylinder 2. Cylinder 2 rotates about a central hollow shaft 3 supported in the end walls of the tank 1 and held against rotation. Rigidly secured to the central shaft 3 within the cylinder 2 is a drum 4 to receive cold brine from a brine cooler. The brine enters drum 4 through a pipe 5 which enters the machine through hollow shaft 3. The brine is projected from drum 4 through nozzles 6 against the inner walls of the cylinder 2.

The level of the water in the tank 1 is maintained slightly below the top of the cylinder 2, and the cylinder 2 is deflected upwardly at the top of the cylinder by a roller 7 which causes the ice formed on the cylinder to peel therefrom at the top of the cylinder and pass onto a suitable chute for delivery to a storage bin. The details of construction and operation of the machine as a whole are fully described in my United States Patent No. 2,005,734 referred to, reference to which is hereby made, it being sufficient here to say that the flexible cylinder must itself be free from leaks and must be incorporated in the machine in such manner as to prevent the cold brine from leaking out of the cylinder into the water in the tank, and to prevent the water in the tank from entering the cylinder.

Referring to Figure 3, the cylinder consists of a plurality of sheets 8 of thin flexible non-corrodible metal, each strip having its ends united and sealed to form one panel of the cylinder, and the several panels being united and sealed at their edges to form the complete cylinder. At each end of the cylinder, flexible aprons 9 are secured and sealed as hereinafter explained for securing the cylinder to end mountings such as bell 10 and a center ring 11 of the machine (see Figure 1). For a machine having a cylinder 30" in diameter and a deflecting roller of 6" to 8" in diameter, the sheets 8 may be .01" thick. Such thickness may vary under different conditions.

In making the metal panels sheets of suitable metal, for example, Monel metal, are cut to proper length and width. Each sheet is then rolled to preform the sheet to form a cylinder of a diameter a little less than half of the diameter of the finished cylinder. In this operation the sheet is roller first from one end and then from the other end. This preforming of the metal sheets greatly reduces the stresses on the sheet when deflected by the deflecting roller 7 and thus increases the fatigue life of the metal. After the preforming operation the ends of each panel are smoothed as with sand paper and bent to form hooks 12, as shown in Figure 5. A cylindrical clamp strip 13, formed as shown in Figure 5, is now slid into the hooks 12 to hold them in a fixed position. The clamp strip is then locked to the hooks by means of a lock strip 14, formed as shown in Figure 5. The lock strip is preferably forced into position while the joint is immersed in vulcalock cement. The strips 13 and 14 securely unite the ends of the strip 8 and the cement seals the union. When the cement is dry the endless band of metal is placed in a sanding drum where the areas adjacent the union are sand-papered and cleaned with a solvent such as benzol. Vulcalock cement is then applied to the under side of clamp strip 13 and to the under side of the strip 8 adjacent the union, and a strip of pure gum rubber 15 (about $\frac{1}{16}$" thick) is then applied, as shown in Figure 5, to completely seal the union. The metal panels thus described and the method of manufacturing them is not intended to be covered by the present application since these inventions are being covered in said copending application Serial No. 557,107 and in another copending application Serial No. 121,768, filed January 22, 1937.

The panels thus formed are joined together to form a cylinder by the following method which is chosen to illustrate the invention.

A sufficient number of endless metal sheets or panels thus formed (seven in the illustrative embodiment) are then placed in a cylindrical vulcanizing form for the purpose of uniting and sealing their edges to form the complete cylinder. In the vulcanizing form a strip of raw rubber 30 (see Figure 7) is placed adjacent the end panels. A number of turns of a steel wire 16 are placed against the layer of raw rubber 30; the turns of the wire being joined with a clip of Monel metal to which all turns are soldered. A strip of raw rubber 17 about $\frac{1}{16}$" thick is then applied to the under side of each end panel to extend beneath the wire 16 and strip 30 and beyond the outer edge of the panel a sufficient distance to provide a flexible apron for securing the cylinder to the head or end bell 10. Beneath the layer of rubber 17 is applied a layer of fabric 18 which has been frictioned with raw rubber on both sides.

In the vulcanizing form the adjacent panels 8 are spaced about one-quarter of an inch apart, and beneath the edges of each two adjacent panels a strip of raw rubber 19 is laid having an added thickness 19ª beneath the spaced edges of the panels 8 to be forced into said space during the vulcanizing operation. Beneath the strip 19, 19ª is laid a layer of fabric 20 frictioned with raw rubber on both sides and terminating at each end short of the end of strip 19. Inside each panel and extending between the strips of rubber 19 is placed the usual material to make an internal form or mold for the rubber to prevent its running during the vulcanizing process.

When each end of the cylinder and each of the inter-sections between panels of the cylinder have been thus treated, an air bag is placed inside of the cylinder and inflated, the ends of the vulcanizing form being securely fastened in place. The cylinder in the vulcanizing form is then cured in steam for a sufficient length of time to vulcanize and unite the rubber connections, and during this cure the air in the air bag is kept at a higher pressure than the steam outside so as to press the rubber against the metal of the panels and force the added thickness 19ª of the strip 19 into the space between panels 8. When this step of the cure has been completed, the vulcanizing form is cooled by water sprays while maintaining the internal pressure of the air bag.

After this vulcanizing step has been completed the air bag is removed, the inside of the cylinder is cleaned, and the fabrics 18 and 20 are cemented with an air-curing rubber cement. Previously cured bands of rubber 21 having grooves 22 formed therein are roughened and cemented to the under side of the end fabrics 18; one groove 22 being located beneath the edge of end panel 8, and the other groove 22 being located beneath and adjacent the outside strand of wire 16. Similarly previously cured bands of rubber 23 having grooves 24 formed therein are roughened and cemented to the fabrics 20; the groove 24 being located beneath the edges of the adjacent panels 8. The ends of the rubber bands 21 and 23 are suitably beveled to fit together and form a continuous even track within the cylinder to slide upon the drum 4 and against which the deflecting roller 7 may act. The grooves 22 and 24 are provided to protect the edges of the panels 8 against the pressure of the drum 4 and deflecting roller 27 during the rotation of the cylinder.

When the rubber bands 21 and 23 have been placed in position, and the air bag is replaced within the vulcanizing form and the air pressure maintained therein until the cement has dried. The cylinder is then removed and cleaned. It is then placed in a test fixture and internal pressure is applied to test for leaks. If no leaks are found the cylinder is attached to the end bell 10 and center ring 11 of the machine by means of wires 25 which hold the end aprons in grooves 26 formed in the end bells and center ring of the machine.

It should be noted that in place of the wire strands 16, a thin flat band of metal may be used to reinforce the end aprons against bulging. Such a band may be of steel or some other material which is stronger than the metal of the cylinder panels.

The completed cylinder when united to the head or end bells is free from leaks, and the sealed unions between the panels will permit a ready flexing of the cylinder without loosening or breaking the sealed union. The wire 16 restrains upward bulging of the end apron adjacent the edge of end panel 8 and thus prevents objectionable deformation of the panel edge when the cylinder is deflected. The rubber strip 15 beneath the clamp strip 13 serves as an insulation to prevent the formation of ice at this union point, which might tend to disintegrate or loosen the sealing cement and rubber from the metal. Similarly the rubber strips 23 act as an insulator for the union between the several panels and prevent the formation of ice on the cylinder over the area protected by said strips. Similarly the end rubber strips 21 act as insulators. With this arrangement the ice forms on the cylinder in strips of a width substantially equal to the distance between rubber strips 23 and is peeled from the cylinder at the point of deflection by the roller 7.

While one specific embodiment of the invention has been described with particularity it is to be understood that the invention is not to be limited thereby, but may have numerous other embodiments within the scope of the appended claims.

I claim:

1. A method of making a flexible cylinder which consists in assembling in a vulcanizing form a plurality of flexible metal cylindrical panels of substantially equal diameters in edge-to-edge spaced relationship, applying strips of rubber and fabric to adjacent panels and within the same with said strips of rubber in contact with said panels to bridge the spaces therebetween, and vulcanizing the connections between the panels by applying an interior pneumatic pressure and an exterior steam pressure against the panel connections, the interior pressure being greater than the exterior pressure.

2. A method of fabricating a flexible cylinder by joining a plurality of cylindrical panels, which comprises sanding the inside edge portions of each panel, assembling panels in a vulcanizing form in spaced edge-to-edge relationship, cementing connecting strips of raw rubber over adjacent edge portions of the panels, vulcanizing said connecting strips by applying steam to the outside of the panels and applying uniform interior pressure against the inside of the panels and connections greater than the exterior steam pressure, and then cementing rubber fabric strips over said vulcanized connecting strips.

3. A method of making a flexible cylinder for heat exchange apparatus which includes the steps of assembling in a vulcanizing form a plurality of metal cylindrical panels in edge to edge spaced relationship, applying strips of rubber to adjacent panels to bridge the space therebetween, vulcanizing the strips of rubber, and cementing strips of fabric to the vulcanized strips of rubber.

4. A method of making a flexible cylinder for heat exchange apparatus which includes the steps of assembling in a vulcanizing form a plurality of metal cylindrical panels in edge to edge spaced relationship, applying strips of rubber to adjacent panels to bridge the space therebetween, vulcanizing the strips of rubber, cementing strips of fabric to the vulcanized strips of rubber, and cementing strips of cured rubber to said strips of fabric.

5. A method of making a flexible cylinder for heat exchange apparatus which includes the steps of assembling a plurality of flexible metal cylindrical panels in edge to edge spaced relationship, applying strips of raw rubber to adjacent panels to bridge the space therebetween, vulcanizing the rubber strips, and forming an annular space adjacent each vulcanized rubber strip by connecting thereto a rubber strip having an annular groove formed therein.

6. A method of making a flexible cylinder for heat exchange apparatus which includes the steps of assembling in a vulcanizing form a plurality of metal cylindrical panels in edge to edge spaced relationship, applying strips of raw rubber to adjacent panels to bridge the space therebetween, vulcanizing said rubber strips by an exterior application of steam under pressure at the same time applying an interior pressure against the strips which is greater than the exterior pressure, and cementing a strip of cured rubber to each of the vulcanized strips.

CROSBY FIELD.

CERTIFICATE OF CORRECTION.

Patent No. 2,210,070. August 6, 1940.

CROSBY FIELD.

It is hereby certified that error appears in the printed specification of the above numbered patent requiring correction as follows: Page 1, first column, line 43, for "though" read --thought--; and second column, line 47, for the word "roller" read --rolled--; page 2, second column, line 23, for the reference numeral "27" read --7--; line 26, strike out "and"; and that the said Letters Patent should be read with this correction therein that the same may conform to the record of the case in the Patent Office.

Signed and sealed this 22nd day of October, A. D. 1940.

(Seal)

Henry Van Arsdale,
Acting Commissioner of Patents.